(12) United States Patent
Kang

(10) Patent No.: US 10,093,143 B2
(45) Date of Patent: Oct. 9, 2018

(54) APPARATUS FOR ACTIVELY CONTROLLING STABILITY OF VEHICLE

(71) Applicant: Hyundai Motor Company, Seoul (KR)

(72) Inventor: Tae Han Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 67 days.

(21) Appl. No.: 15/263,704

(22) Filed: Sep. 13, 2016

(65) Prior Publication Data

US 2017/0313152 A1 Nov. 2, 2017

(30) Foreign Application Priority Data

May 2, 2016 (KR) .................. 10-2016-0054008

(51) Int. Cl.
*B60G 21/073* (2006.01)
*B60G 17/016* (2006.01)
*B60G 17/08* (2006.01)
*B60G 11/27* (2006.01)

(52) U.S. Cl.
CPC .......... *B60G 17/0162* (2013.01); *B60G 11/27* (2013.01); *B60G 17/08* (2013.01); *B60G 21/073* (2013.01); *B60G 2202/24* (2013.01); *B60G 2202/442* (2013.01);
(Continued)

(58) Field of Classification Search
CPC .............. B60G 17/0162; B60G 17/08; B60G 17/0277; B60G 21/073; B60G 21/055; B60G 21/0551; B60G 21/0555; B60G 21/0553; B60G 21/0558; B60G 11/27; B60G 2800/012; B60G 2204/62; B60G 2204/1224; B60G 2204/82; B60G 2204/122; B60G 2202/24; B60G 2202/135; B60G 2202/442; B60G 2202/412; B60G 2202/32; B60G 2202/1522; B60G 2202/22; B60G 2202/242; B60G 2206/427
USPC ............ 280/5.502, 5.511, 124.106; 267/186, 267/187, 188, 191, 277

See application file for complete search history.

(56) References Cited

U.S. PATENT DOCUMENTS

| | | | | |
|---|---|---|---|---|
| 2,757,376 A * | 7/1956 | Brueder | ................ | B60G 11/64 |
| | | | | 267/64.19 |
| 3,556,542 A * | 1/1971 | Capgras | ................ | B60G 11/64 |
| | | | | 267/64.16 |

(Continued)

FOREIGN PATENT DOCUMENTS

| | | |
|---|---|---|
| JP | 2007-015592 A | 1/2007 |
| JP | 2007-137153 A | 6/2007 |

(Continued)

*Primary Examiner* — Keith J Frisby
(74) *Attorney, Agent, or Firm* — Mintz Levin Cohn Ferris Glovsky and Popeo, P.C.; Peter F. Corless

(57) ABSTRACT

An apparatus for actively controlling stability of a vehicle is provided. The apparatus includes a strut tower brace bar that is disposed in a lateral direction of a vehicle body and opposite ends of the strut tower brace bar are individually connected to upper portions of left and right shock absorbers. Additionally, an actuator is disposed at a predetermined position in a longitudinal direction of the strut tower brace bar. When torsional deformation of the strut tower brace bar occurs due to rolling of the vehicle body, the actuator is configured to restore the strut tower brace bar by receiving gas from the left and right shock absorbers.

12 Claims, 6 Drawing Sheets

(52) U.S. Cl.
CPC .. *B60G 2204/1224* (2013.01); *B60G 2204/62* (2013.01); *B60G 2800/012* (2013.01)

(56) References Cited

U.S. PATENT DOCUMENTS

| | | | | |
|---|---|---|---|---|
| 5,791,444 | A * | 8/1998 | Schiffler | B60G 21/0555 188/293 |
| 5,882,017 | A * | 3/1999 | Carleer | B60G 21/0553 267/187 |
| 6,394,240 | B1 * | 5/2002 | Barwick | B60G 21/0553 188/293 |
| 2004/0217569 | A1 * | 11/2004 | Gradu | B60G 21/0555 280/124.107 |
| 2005/0121841 | A1 * | 6/2005 | Gradu | B60G 21/0556 267/186 |
| 2008/0042377 | A1 * | 2/2008 | Beetz | B60G 21/0555 280/5.511 |

FOREIGN PATENT DOCUMENTS

| | | |
|---|---|---|
| KR | 10-2005-0010309 A | 1/2005 |
| KR | 10-2007-0034754 A | 3/2007 |
| KR | 2007-0066314 A | 6/2007 |
| KR | 2011-0096290 A | 8/2011 |

\* cited by examiner

APPARATUS FOR ACTIVELY CONTROLLING STABILITY OF VEHICLE

CROSS REFERENCE TO RELATED APPLICATION

The present application claims priority to Korean Patent Application No. 10-2016-0054008, filed May 2, 2016, the entire contents of which is incorporated herein for all purposes by this reference.

BACKGROUND

Field of the Invention

The present invention relates to an apparatus for actively controlling stability of a vehicle, the apparatus capable of restoring a position of a vehicle when rolling of a vehicle body occurs due to cornering, impact, etc. of the vehicle while the vehicle is being driven.

Description of the Related Art

Generally, as a vehicle technology advances, passengers desire precise handling performance and a comfortable, relaxing ride, thus manufacturers strive to develop vehicles meeting such customer needs. Recently, to enhance the ride comfort and handling performance, various new technologies are applied to a chassis, particularly suspensions, etc., or technology for reducing movements of a vehicle by increasing the strength of a vehicle body is applied. When such new technologies are applied to the chassis, the increase in the strength of the vehicle body causes ancillary problems such as increases in weight and cost of the vehicle. Accordingly, the increase in the strength of the vehicle body is limited due to quality problems and an increase in material costs.

FIG. 1 is a view showing an apparatus for actively controlling stability of a vehicle according to the related art. Without mounting the apparatus for actively controlling stability of the vehicle, a vehicle body rolls to line A. However, by mounting the apparatus for actively controlling stability of the vehicle, a roll angle is reduced to line B. In particular, among chassis, a representative new technology of suspensions enables the position of a vehicle during cornering to be adjusted by applying air suspension or active roll control. However, it may be difficult to implement such systems since the vehicle body does not react immediately due to a long process of adjusting the position of the vehicle. In addition, when a passenger enters the vehicle, the vehicle body may be unable to react immediately causing the passenger to feel a delay in the stabilization of the position of the vehicle.

Referring to a process of an active stabilizer bar shown in FIG. 1, the position of a vehicle may be adjusted through a tire W→a suspension 30→a stabilizer bar 20 and a hydraulic actuator 50→the suspension 30→a vehicle body BD→a passenger (not shown). Additionally, the conventional system controlling the chassis requires hydraulic control using high pressure to control a heavy vehicle body. Thus, the conventional system complicates the configuration, and increases the weight and cost of the vehicles.

The foregoing is intended merely to aid in the understanding of the background of the present invention, and is not intended to mean that the present invention falls within the purview of the related art that is already known to those skilled in the aft.

SUMMARY

Accordingly, the present invention provides an apparatus for actively controlling stability of a vehicle, the apparatus being capable of controlling a vehicle body with low pressure by directly controlling the vehicle body, when a passenger enters the vehicle, rather than controlling the chassis of the vehicle.

According to one aspect of the present invention, an apparatus for actively controlling stability of a vehicle may include: a strut tower brace bar disposed in a lateral direction of a vehicle body, wherein opposite ends of the strut tower brace bar are individually connected to upper portions of left and right shock absorbers; and an actuator disposed at a predetermined position in a longitudinal direction of the strut tower brace bar, wherein when torsional deformation of the strut tower brace bar occurs by rolling of the vehicle body, the actuator may be configured to restore the strut tower brace bar by receiving gas filled in the left and right shock absorbers.

The actuator may include: a rotary shaft member having a plurality of blade parts that extend in radial directions on an outer circumferential surface of the rotary shaft member; and a housing that surrounds or encloses the rotary shaft member to allow the shaft member to axially rotate, and defining a space where the blade parts are disposed, wherein the space may be divided into a plurality of chambers by the blade parts, and wherein when the rotary shaft member axially rotates, volumes of the chambers may be changed by the blade parts.

The rotary shaft member may be the strut tower brace bar and may be integrally connected to the strut tower brace bar. The apparatus may include a plurality of gas tubes that form gas flow paths disposed between the left and right shock absorbers and associated chambers by individually connecting the shock absorbers and the chambers. A plurality of partition parts protrude toward a center of the housing from an inner circumferential surface of the housing, and the outer circumferential surface of the rotary shaft member contacts the partition parts.

The blade parts may include a first blade and a second blade that protrude in opposite directions from each other from the outer circumferential surface of the rotary shaft member, and the partition parts may include a first partition and a second partition individually disposed at diagonally opposite positions. The volumes of the chambers may be made equal by the blade parts and the partition parts that are arranged alternately. The gas tubes may include two first tubes connected to the left shock absorber, and two second tubes connected to the right shock absorber. The two first tubes may be individually connected to the chambers disposed at diagonally opposite positions, and the two second tubes may be individually connected to the remaining chambers disposed at the other diagonally opposite positions.

Each of the partition parts may include a first sealing member to seal a junction between the rotary shaft member and the partition parts, thereby sealing the chambers. Each of the blade parts may include a second sealing member to seal a junction between the blade parts and an inner circumferential surface of the housing, thereby sealing the chambers. According to the apparatus for actively controlling stability of the vehicle having the structure as described above, in comparison with an apparatus for controlling stability of a vehicle using a conventional stabilizer bar and a hydraulic actuator, the apparatus of the present invention may use nitrogen gas supplied from a shock absorber without using an additional hydraulic pressure generator. The apparatus of this invention is simplified in structure and may reduce overall costs.

When the vehicle body rolls in a left direction, the gas may flow in a diagonal direction to restore the strut tower bar and when the vehicle body rolls in a right direction, the gas may flow in the other diagonal direction to restore the strut tower bar. Thus, the position of the vehicle body may be continuously controlled during cornering or driving on a rough road so that ride and handling (R&H) performance may be enhanced. In particular, in comparison with an apparatus for controlling stability of a vehicle using suspension control, the apparatus of the present invention may directly control the vehicle body when a passenger enters the vehicle. Therefore, a passenger feels that the vehicle is stabilized more rapidly than in the conventional art, which is advantageous in terms of sensitivity.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
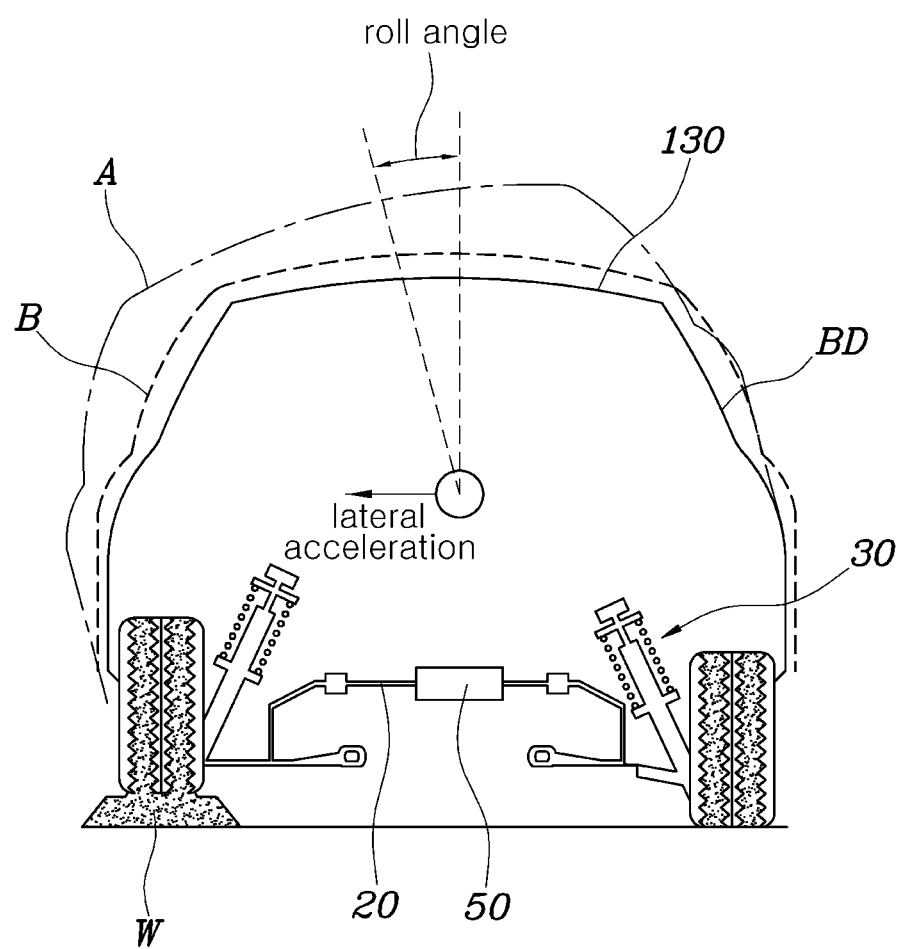
FIG. 1 is a view showing an apparatus for actively controlling stability of a vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings. Throughout the drawings, the same reference numerals will refer to the same or like parts.

Figure 2:
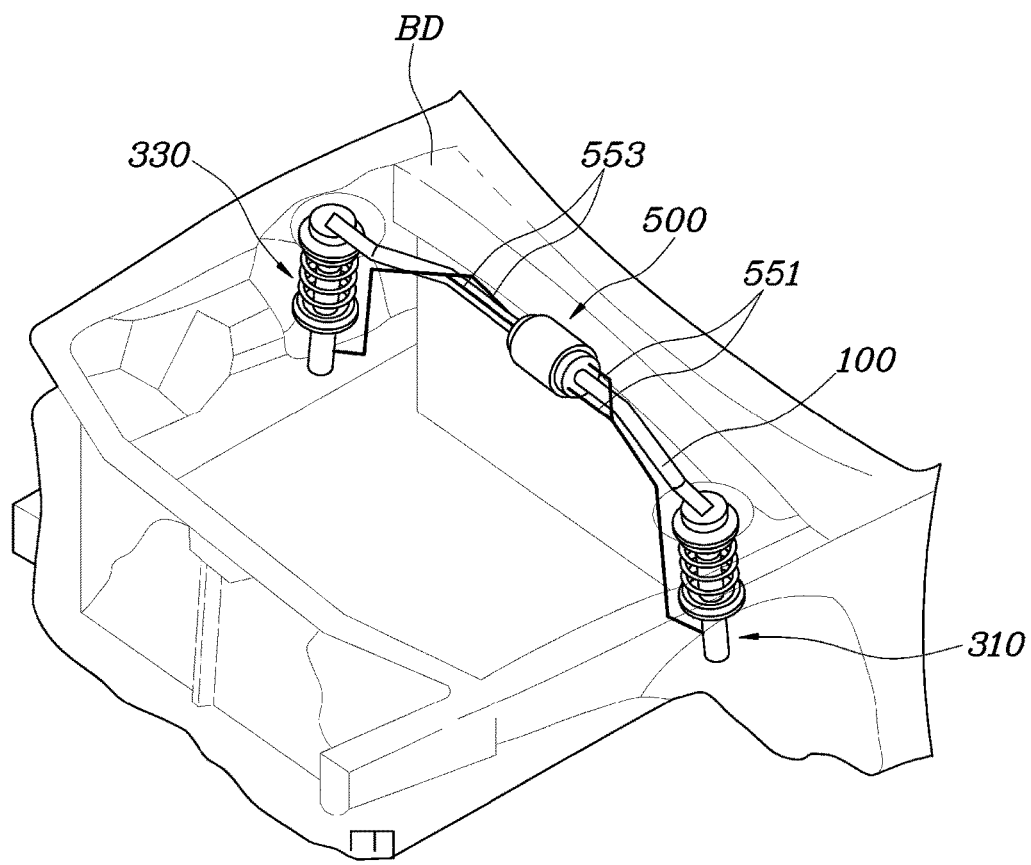
FIG. 2 is a view showing an apparatus for actively controlling stability of a vehicle mounted on a vehicle body according to an exemplary embodiment of the present invention.
Figure 3:
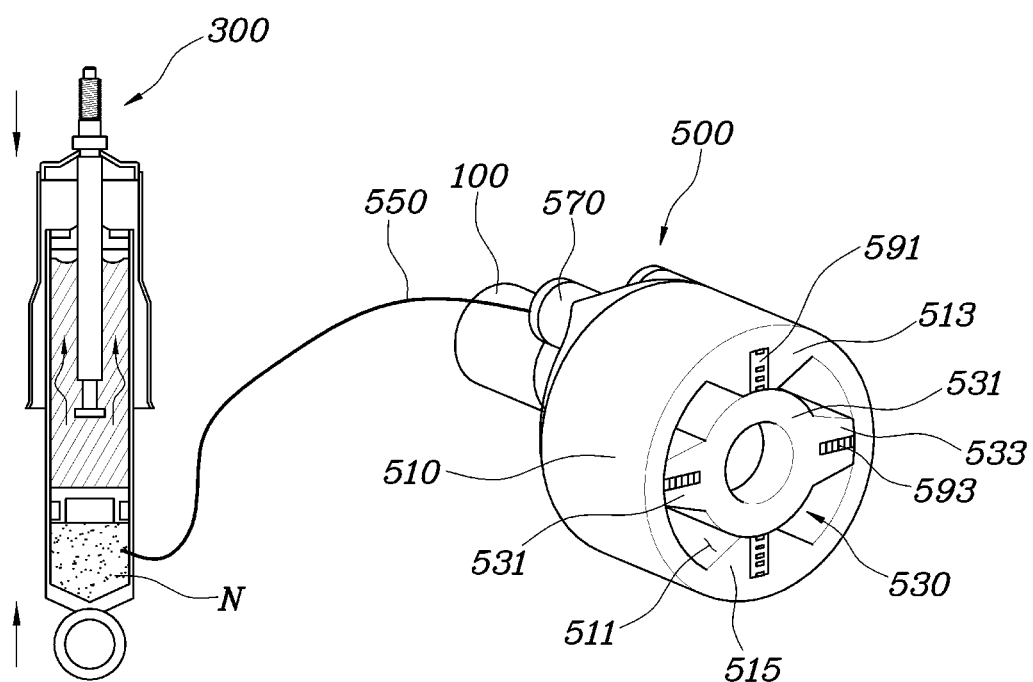
FIG. 3 is a view showing in detail a shock absorber and an actuator of FIG. 2 according to an exemplary embodiment of the present invention.
Figure 4:
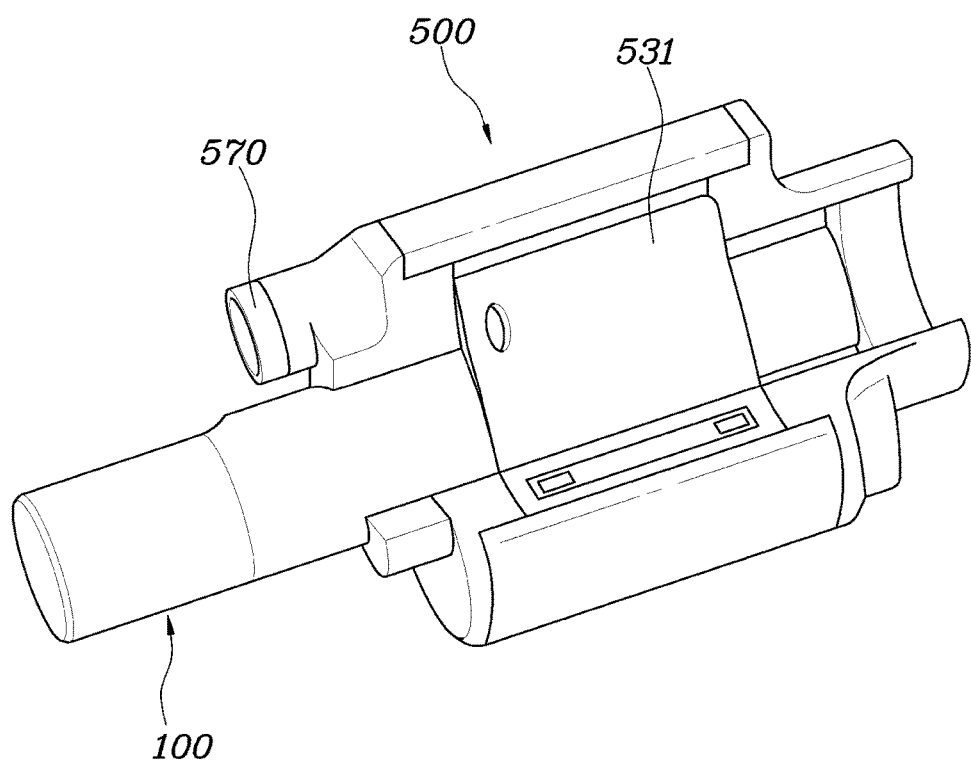
FIG. 4 is a view showing in detail the actuator of FIG. 2 according to an exemplary embodiment of the present invention.
Figure 5:
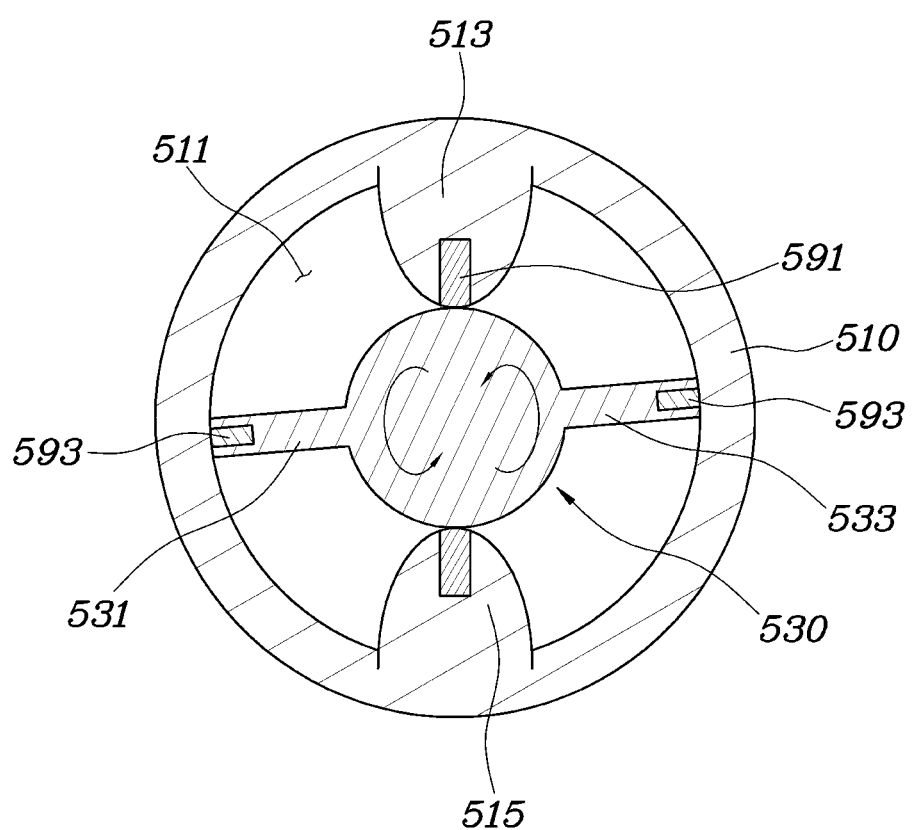
FIGS. 5 to 6 are views showing operation of FIG. 2 according to an exemplary embodiment of the present invention.
Figure 6:
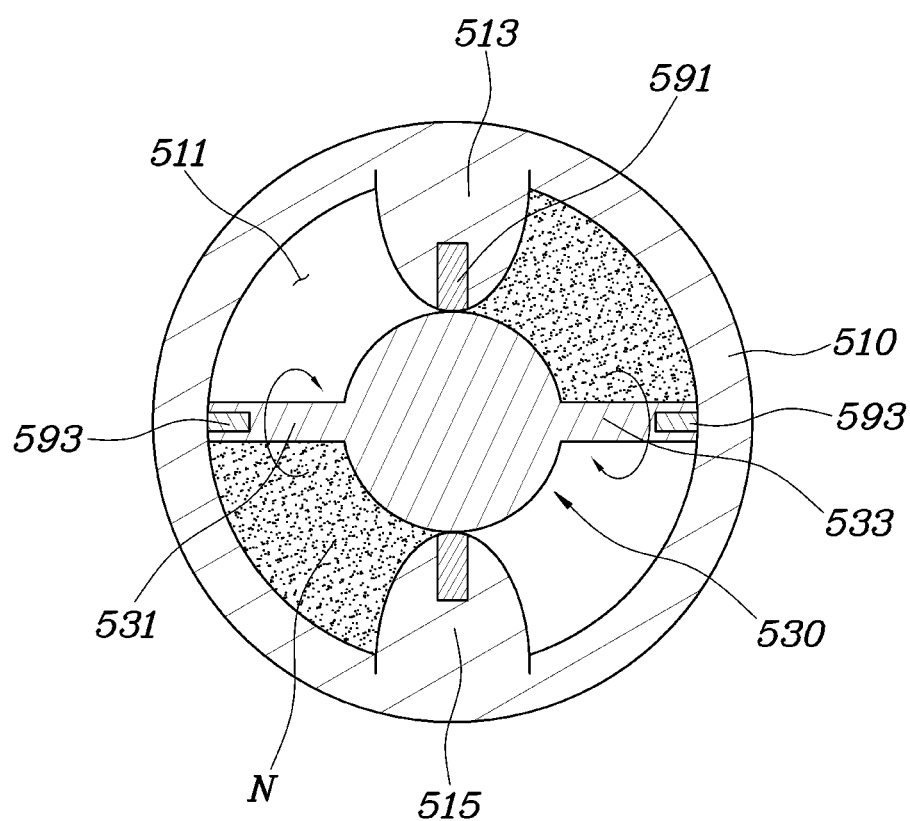

FIG. 2 is a view showing an apparatus for actively controlling stability of a vehicle mounted on a vehicle body BD according to an exemplary embodiment of the present invention. FIG. 3 is a view showing in detail shock absorbers 310 and 330 and an actuator 500 of FIG. 2. FIG. 4 is a view showing in detail the actuator 500 of FIG. 2. Also, FIGS. 5 to 6 are views showing operation of FIG. 2.

According to an exemplary embodiment of the present invention, the apparatus for actively controlling stability of a vehicle may include: a strut tower brace bar 100 disposed in a lateral direction of a vehicle body BD, wherein opposite ends of the strut tower brace bar may be individually connected to upper portions of left and right shock absorbers 310 and 330; and an actuator 500 disposed at a predetermined position in a longitudinal direction of the strut tower brace bar 100, wherein when torsional deformation of the strut tower brace bar 100 occurs by rolling of the vehicle body BD, the actuator may be configured to restore the strut tower brace bar 100 by receiving gas N filled in the left and right shock absorbers 310 and 330.

The actuator 500 may include a rotary shaft member 530 and a housing 510. The rotary shaft member 530 may include a plurality of blade parts 531 and 533 that extend in radial directions on the outer circumferential surface of the rotary shaft member. In addition, the housing 510 may surround the rotary shaft member 530 to allow the shaft member 530 to rotate axially, and defines a space in which the blade parts 531 and 533 may be disposed. In particular, the space of the housing 510 may be divided into a plurality of chambers 511 by the blade parts 531 and 533. Therefore, when the rotary shaft member 530 rotates axially, the volume of the chambers 511 may change by the blade parts 531 and 533. The rotary shaft member 530 may be the strut tower brace bar 100. Otherwise, the rotary shaft member 530 may be integrally connected to the strut tower brace bar 100. When the vehicle body BD rolls, the rotary shaft member may be configured to receive the torsional deformation of the vehicle body BD from the strut tower brace bar 100.

The actuator 500 may further include a plurality of gas tubes 550 that operate as or form gas flow paths disposed between the shock absorbers 310 and 330 and associated chambers 511. The gas tubes 550 may transfer gas N from the shock absorbers 310 and 330 to the chambers 511 and return the gas N to the shock absorbers 310 and 330 by individually connecting the shock absorbers 310 and 330 to the chambers 511. Particularly, the gas N may be nitrogen gas provided at the lower side of a lower end accumulator of the shock absorbers 310 and 330. The gas N may move between the shock absorbers 310 and 330, and the chambers 511, and may operate in the same manner as in a hydraulic breaker using Bernoulli's theorem. In addition, each of the gas tubes 550 may be connected to a gas inlet port 570 to allow the gas N to be supplied to the chambers 511 via the gas inlet port 570. The gas tubes 550 may be made of steel or rubber.

In describing the housing 510 of the actuator 500 in detail, a plurality of partition parts 513 and 515 may protrude toward the center of the housing 510 from the inner circumferential surface of the housing 510. In particular, the partition parts 513 and 515 may contact the outer circumferential surface of the rotary shaft member 530 to seal the chambers 511. The partition parts 513 and 515 may include two parts which may be a first partition 513 and a second partition 515 individually disposed at diagonally opposite positions.

Furthermore, the blade parts 531 and 533 may be a first blade 531 and a second blade 533 that protrude in directions opposite to each other from the outer circumferential surface of the rotary shaft member 530. Therefore, the volume of the chambers 511 are made equal by the blade parts 531 and 533 and the partition parts 513 and 515 arranged alternately. The first blade 531 and the second blade 533 may be spaced apart from each other at about 180 degree angles, and the first partition 513 and the second partition 533 may be spaced apart from each other at about 180 degree angles, and thus, each of the blade parts 531 and 533 and each of the partition parts 513 and 515 may be spaced apart from each other at about 90 degree angles. Therefore, the number of the chambers 511 may be four. In addition, the gas tubes 550 may include two first tubes 551 connected to the left shock absorber 310, and two second tubes 553 connected to the right shock absorber 330. The first tubes 551 may be individually connected to the two chambers 511 disposed at diagonally opposite positions among the four chambers 511, and the second tubes 553 may be individually connected to the two remaining chambers 511 disposed at the other diagonally opposite positions.

Accordingly, as shown in FIGS. 5 to 6, when rolling occurs while the vehicle is being driven, compressive force is applied to one of the shock absorbers 310 and 330, and pressure of the compressed shock absorber increases causing torsional deformation of the strut tower brace bar 100. The rotary shaft member 530 connected to the strut tower brace bar 100 thus is configured to rotate axially at a predetermined angle. Therefore, as shown in FIG. 5, the four chambers 511 having the same volumes may change and thus, each of the pairs of the two chambers 511 disposed at diagonally opposite positions may have the same volume. When the basic volume of each chamber is about 10, the two chambers 511 disposed at diagonally opposite positions may each have a volume of about 7, and the two remaining chambers 511 disposed at the other diagonally opposite positions may each have a volume of about 3 due to the torsional deformation.

Therefore, the shock absorbers 310 and 330 may be configured to individually supply the gas N to the chambers having reduced volumes via the gas tubes 550, the gas being supplied in an amount equal to the original volume of about 10 per chamber 511. As a volume of about 10 of the gas N is individually supplied to the chambers having a volume of about 7, the pressure of the gas N may be applied to the blade parts 531 and 533 and thus, the blade parts 531 and 533 may return to an original state or position, and the torsional deformation of the strut tower brace bar 100 may be restored. In particular, as described above, it is advantageous to restore the strut tower brace bar 100 more rapidly by simultaneously using the chambers 511 disposed at diagonally opposite positions without using one chamber 511. In addition, each of the partition parts 513 and 515 may include a first sealing member 591 to seal the junction between the rotary shaft member 530 and the partition parts 513 and 515, thereby sealing the chambers 511. Each of the blade parts 531 and 533 may also include a second sealing member 593 to seal the junction between the blade parts 531 and 533 and the inner circumferential surface of the housing 510, thereby sealing the chambers 511.

Although the exemplary embodiment of the present invention discloses that there are two blade parts and four partition parts, the number of the components may be changed without limitation according to the design or environment. Therefore, the number of the components should not be limited by the above described number.

According to the exemplary embodiment of the present invention, the apparatus for actively controlling stability of the vehicle has a simplified structure capable of reducing the cost. In comparison with an apparatus for controlling stability of a vehicle using a conventional stabilizer bar and a hydraulic actuator, the apparatus of the present invention may use nitrogen gas supplied from a shock absorber without using an additional hydraulic pressure generator. Thus, the structure of this invention is simplified in structure and may reduce overall costs.

When the vehicle body rolls in a left direction, the gas may flow in a diagonal direction to restore the strut tower bar 100 and when the vehicle body rolls in a right direction, the gas may flow in the other diagonal direction to restore the strut tower bar. Thus, the position of the vehicle body may continuously be controlled during cornering or driving on a rough road and thus, R&H performance may be enhanced. In particular, in comparison with an apparatus for controlling stability of a vehicle using a suspension control, the apparatus of the present invention may directly control the vehicle body when a passenger enters the vehicle. Therefore, the passenger feels that the vehicle is stabilized more rapidly than in the conventional art, which is advantageous in terms of sensitivity.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for actively controlling stability of a vehicle, comprising:
   a strut tower brace bar disposed in a lateral direction of a vehicle body, wherein opposite ends of the strut tower brace bar are individually connected to upper portions of left and right shock absorbers; and
   an actuator disposed at a predetermined position in a longitudinal direction of the strut tower brace bar, wherein when torsional deformation of the strut tower brace bar occurs by rolling of the vehicle body, the actuator is configured to restore the strut tower brace bar by receiving gas filled in the left and right shock absorbers.

2. The apparatus of claim 1, wherein the actuator includes:
   a rotary shaft member having a plurality of blade parts that extend in radial directions on an outer circumferential surface of the rotary shaft member; and
   a housing that surrounds the rotary shaft member to allow the rotary shaft member to rotate axially, and defines a space where the blade parts are disposed, wherein the space is divided into a plurality of chambers by the blade parts, and when the rotary shaft member rotates axially, volume of the chambers changes by the blade parts.

3. The apparatus of claim 2, wherein the rotary shaft member is the strut tower brace bar.

4. The apparatus of claim 2, wherein the rotary shaft member is integrally connected to the strut tower brace bar.

5. The apparatus of claim 2, further comprising:
a plurality of gas tubes that are gas flow paths disposed between the left and right shock absorbers and associated chambers by individually connecting the shock absorbers and the chambers.

6. The apparatus of claim 5, wherein a plurality of partition parts protrude toward a center of the housing from an inner circumferential surface of the housing, and the outer circumferential surface of the rotary shaft member contacts the partition parts.

7. The apparatus of claim 6, wherein the blade parts include a first blade and a second blade that protrude in directions opposite to each other from the outer circumferential surface of the rotary shaft member.

8. The apparatus of claim 7, wherein the partition parts include a first partition and a second partition that are individually disposed at diagonally opposite positions, and the volume of the chambers are equal by the blade parts and the partition parts that are arranged alternately.

9. The apparatus of claim 6, wherein each of the partition parts includes a first sealing member to seal a junction between the rotary shaft member and the partition parts, thereby sealing the chambers.

10. The apparatus of claim 5, wherein the gas tubes include:
two first tubes connected to the left shock absorber and two second tubes connected to the right shock absorber.

11. The apparatus of claim 10, wherein the two first tubes are individually connected to the chambers disposed at diagonally opposite positions, and the two second tubes are individually connected to the remaining chambers disposed at the other diagonally opposite positions.

12. The apparatus of claim 2, wherein each of the blade parts includes a second sealing member to seal a junction between the blade parts and an inner circumferential surface of the housing, thereby sealing the chambers.

\* \* \* \* \*